(12) United States Patent
Takahoshi et al.

(10) Patent No.: US 12,352,992 B2
(45) Date of Patent: Jul. 8, 2025

(54) OPTICAL FILTER

(71) Applicant: AGC Inc., Tokyo (JP)

(72) Inventors: Hideaki Takahoshi, Tokyo (JP);
Kazuya Takemoto, Tokyo (JP);
Keisuke Kawai, Tokyo (JP)

(73) Assignee: AGC Inc., Tokyo (JP)

( * ) Notice: Subject to any disclaimer, the term of this patent is extended or adjusted under 35 U.S.C. 154(b) by 488 days.

(21) Appl. No.: 17/932,849

(22) Filed: Sep. 16, 2022

(65) Prior Publication Data

US 2023/0103350 A1  Apr. 6, 2023

(30) Foreign Application Priority Data

Sep. 29, 2021  (JP) .................. 2021-159993

(51) Int. Cl.
*G02B 5/28*  (2006.01)
*G02B 5/20*  (2006.01)

(52) U.S. Cl.
CPC ............. *G02B 5/282* (2013.01); *G02B 5/208* (2013.01)

(58) Field of Classification Search
CPC ........ G02B 5/282; G02B 5/208; G02B 5/281; G02B 5/28; G02B 5/26; G01S 7/4816; G01S 7/481
See application file for complete search history.

(56) References Cited

U.S. PATENT DOCUMENTS

| | | | |
|---|---|---|---|
| 9,354,369 B2 | 5/2016 | Hendrix et al. | |
| 2014/0014838 A1* | 1/2014 | Hendrix | G01J 5/0802 |
| | | | 359/359 |
| 2018/0275318 A1* | 9/2018 | Amin | C03C 10/00 |
| 2021/0103078 A1* | 4/2021 | Neuman | G02B 5/281 |
| 2022/0317353 A1* | 10/2022 | Hart | G02B 1/115 |

* cited by examiner

*Primary Examiner* — Balram T Parbadia
(74) *Attorney, Agent, or Firm* — Oblon, McClelland, Maier & Neustadt, L.L.P.

(57) ABSTRACT

An optical filter, including: a substrate; and a dielectric multilayer film laid on or above at least one major surface of the substrate, the dielectric multilayer film including at least two different layers, where: the dielectric multilayer film includes a film having a spin density of $5.0 \times 10^{10}$/nm·cm² or larger, a surface on a dielectric multilayer film side has a nanoindentation hardness of 5.5 GPa or higher when a measurement load is 1 mN, a maximum transmittance at an incident angle of 0° in a wavelength range of 400 nm to 680 nm is 6% or lower, a maximum reflectance at an incident angle of 5° in the wavelength range of 400 nm to 680 nm is 20% or lower, and an average transmittance at an incident angle of 0° in at least one wavelength range having a width of 50 nm is 90% or higher.

12 Claims, 3 Drawing Sheets

OPTICAL FILTER

CROSS-REFERENCE TO RELATED APPLICATIONS

This application claims priority from Japanese Patent Application No. 2021-159993 filed on Sep. 29, 2021, the entire subject matter of which is incorporated herein by reference.

TECHNICAL FIELD

The present disclosure relates to an optical filter that interrupts visible light and transmits infrared light.

BACKGROUND ART

To increase the sensitivity of the sensor such as a light detection and ranging (LiDAR) sensor, an optical filter that transmits near infrared light of 800 nm or longer and interrupts visible light causing external disturbance is used as a cover of a remote sensor module using near infrared light. In the case of a cover of a vehicular sensor, the optical filter preferably has a low transmittance of light in a visible range of 400 nm to 680 nm from the viewpoints of making the inside of the sensor less visible from outside and making the external appearance of the cover look black to obtain high design performance.

Among optical filters, reflection optical filters are known in which dielectric thin films having different refractive indices are laid alternately (dielectric multilayer film) on one or both surfaces of a transparent substrate and which reflect light to interrupt utilizing light interference.

Absorption optical filters are also known which employ, as a multilayer film, a material that is optically absorptive.

For example, Patent document 1 discloses an optical filter having a dielectric multilayer film in which high refractive index layers and low refractive index layers are laid alternately. The high refractive index layers are silicon hydride layers whose extinction coefficient k in a wavelength range of 800 to 1,100 nm is smaller than 0.0005.

CITATION LIST

Patent Literature

Patent document 1: U.S. Pat. No. 9,354,369

However, in reflection optical filters that interrupt visible light by reflecting it, it is difficult to secure necessary design performance because the external surface(s) is a mirror surface.

In absorption optical filters, whereas they can reduce visible light transmissivity and visible light reflectivity because of their visible light absorption property, it is difficult to maintain necessary near infrared transmissivity if only the visible light absorption property is enhanced because materials that absorb visible light also tend to absorb light in a near infrared range.

Furthermore, an optical filter is required to be high in reliability when it is applied to a use as a cover of a sensor module. Specifically, the surface of the optical filter is required to be high in hardness from the viewpoint of making the optical filter less prone to development of cracks or scratches when it is installed or used.

Incidentally, it is inferred that in the optical filter disclosed in Patent document 1 the extinction coefficient in a wavelength range of 600 to 680 nm that includes a visible range is also small, that is, the transmittance in this wavelength range is also high, because the extinction coefficient of the high refractive index layers in a wavelength range of 800 to 1,100 nm is small though it uses a visible light absorbable material. In addition, if the reflectance in the wavelength range of 600 to 680 nm is increased to compensate for the shielding property in this wavelength range by the reflection ability of the multilayer film, the refection color becomes red to lower the design performance.

SUMMARY OF INVENTION

An object of the present invention is to provide an optical filter that exhibits high shieldability against visible light in a wavelength range of 400 to 680 nm and high transmissivity of near infrared light in a wavelength range of 800 nm or longer, is high in reliability, and looks black.

The invention provides optical filters having the following configurations:

(1) An optical filter including:
a substrate; and
a dielectric multilayer film laid on or above at least one major surface of the substrate as an outermost layer, in which:
the dielectric multilayer film is a laminate including a low refractive index film and a high refractive index film laid on each other;
the low refractive index film or the high refractive index film satisfies the following spectral characteristics (i-1) and (i-2);
the optical filter satisfies all of the following spectral characteristics (ii-1) to (ii-3); and
the optical filter has a nanoindentation hardness of 5.5 GPa or higher when a measurement load is 1 mN:
(i-1) an extinction coefficient $k_{600}$ at a wavelength of 600 nm is 0.12 or larger;
(i-2) a minimum extinction coefficient $k_{800-1570MIN}$ in a wavelength range of 800 to 1,570 nm is 0.01 or smaller;
(ii-1) a maximum transmittance $T_{400-680(0deg)MAX}$ at an incident angle of 0° in a wavelength range of 400 to 680 nm is 6% or lower;
(ii-2) a maximum reflectance $R_{400-680(5deg)MAX}$ at an incident angle of 5° in the wavelength range of 400 to 680 nm is 20% or lower; and
(ii-3) an average transmittance $T_{X-Y(0deg)AVE}$ at an incident angle of 0° in a wavelength range of X to Y nm is 90% or higher, where X is in a range of 800 to 1,530 nm, Y is in a range of 850 to 1,580 nm, and Y−X=50 nm.

(2) An optical filter including:
a substrate; and
a dielectric multilayer film laid on or above at least one major surface of the substrate as an outermost layer, in which:
the dielectric multilayer film is a laminate including a low refractive index film and a high refractive index film laid on each other;
the low refractive index film or the high refractive index film has a spin density of $5.0\times10^{10}$/nm·cm² or higher;
the optical filter satisfies all of the following spectral characteristics (ii-1) to (ii-3); and
the optical filter has a nanoindentation hardness of 5.5 GPa or higher when a measurement load is 1 mN:
(ii-1) a maximum transmittance $T_{400-680(0deg)MAX}$ at an incident angle of 0° in a wavelength range of 400 to 680 nm is 6% or lower;

(ii-2) a maximum reflectance $R_{400-680(5deg)MAX}$ at an incident angle of 5° in the wavelength range of 400 to 680 nm is 20% or lower; and (ii-3) an average transmittance $T_{X-Y(0deg)AVE}$ at an incident angle of 0° in a wavelength range of X to Y nm is 90% or higher, where X is in a range of 800 to 1,530 nm, Y is in a range of 850 to 1,580 nm, and Y−X=50 nm.

The invention can provide an optical filter that exhibits high shieldability against visible light in a wavelength range of 400 to 680 nm and high transmissivity of near infrared light in a wavelength range of 800 nm or longer, is high in reliability, and looks black.

DETAILED DESCRIPTION OF EMBODIMENT

Figure 1:
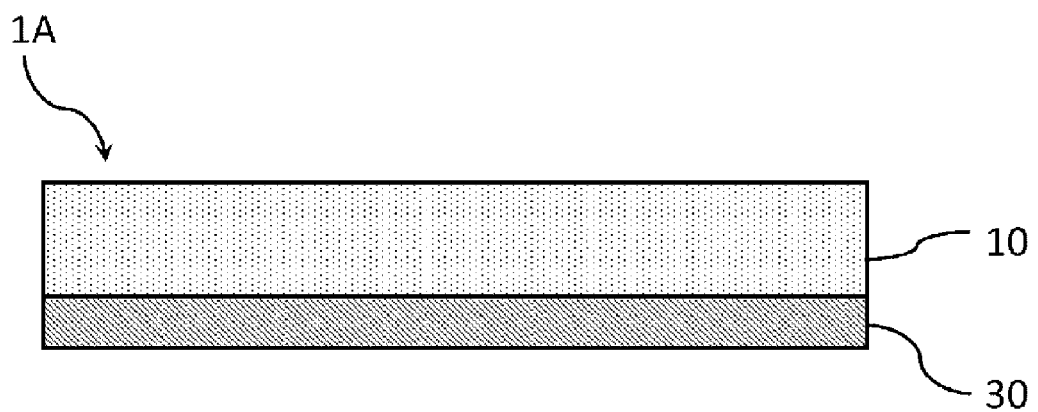
FIG. 1 is a schematic sectional view illustrating one example of an optical filter according to one embodiment.

In this specification, for example, the expression "the transmittance is 90% or higher in a particular wavelength range" means that the transmittance is not lower than 90% in all of that wavelength range, that is, the lowest transmittance in that wavelength range is 90% or higher. Likewise, for example, the expression "the transmittance is 1% or lower in a particular wavelength range" means that the transmittance is not higher than 1% in all of that wavelength range, that is, the highest transmittance in that wavelength range is 1% or lower. An average transmittance in a particular wavelength range is an arithmetic average of transmittance values every 1 nm in wavelength in that wavelength range. The term "refractive index" means a refractive index for light having a wavelength 1,550 nm at 20° C. unless otherwise specified.

Spectral characteristics can be measured using a spectrophotometer.

An extinction coefficient can be calculated by optical thin-film calculation software on the basis of measured values of a reflectance, a transmittance, and a thickness of a single-layer film formed on a quartz substrate.

A visible reflectance is a luminous reflectance (Y value) in the CIE color system.

A nanoindentation hardness can be measured using a hardness meter under the condition of a measurement load of 1 mN according to ISO14577.

In this specification, the symbol "-" or the word "to" that is used to express a numerical range includes the numerical values before and after the symbol or the word as the upper limit and the lower limit of the range, respectively.

A spin density can be measured using an electron spin resonance instrument. Since spin densities that can be measured using the electron spin resonance instrument include spin densities associated with silicon dangling bonds, dangling bonds of a silica film, transition metal ions in a glass substrate, etc., proper working on a sample before a measurement and peak separation after the measurement are necessary.

In the working on a sample, substrate glass on which a multilayer film is formed should be removed as thoroughly as possible by polishing after cutting out an optical filter including the multilayer film into a proper size, whereby influence of a spin signal originating from the substrate glass can be minimized. The peak separation after a measurement can be performed by curve fitting, for example. A signal originating from silicon dangling bonds is observed as an isotropic signal in which g is 2.004 to 2.007 and the line width is 4 to 8 gauss, and these parameters are obtained as a result of peak separation by curve fitting using a linear combination function of a line-width-equalized Gaussian function and a Lorentz function. The term "line width" as used here means the difference between magnetic fields at a peak top and a peak bottom in an electron spin resonance spectrum that is obtained in differential form.

A spin density can also be calculated on the basis of an extinction coefficient because there is a correlation between the spin density and the extinction coefficient. For example, a spin density of amorphous silicon can be calculated using the approximation equation shown in FIG. 5 on the basis of an extinction coefficient $k_{600}$.

<Optical Filter>

An optical filter according to one embodiment of the invention (hereinafter may also be referred to as "present filter") is an optical filter that is equipped with a substrate and a dielectric multilayer film that is laid on or above at least one of the major surfaces of the substrate as an outermost layer.

Figure 2:
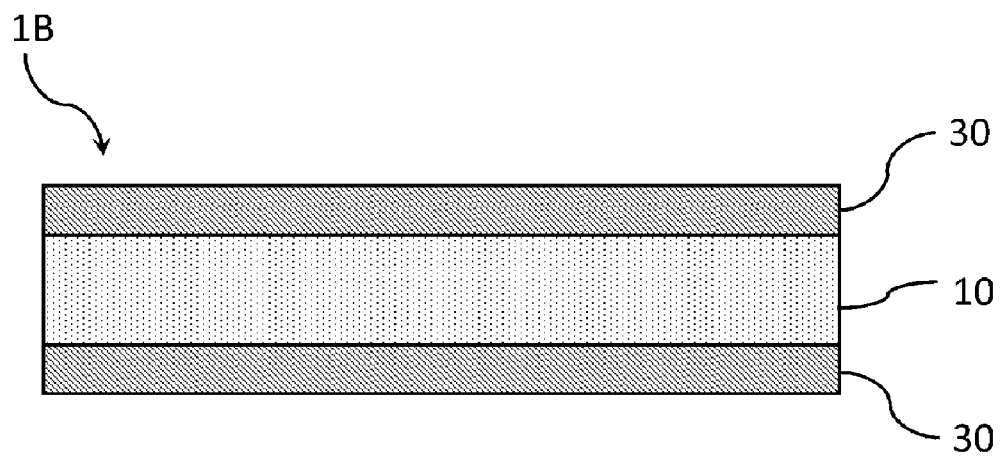
FIG. 2 is a schematic sectional view illustrating another example of an optical filter according to the embodiment.

Examples of a configuration of the present filter will be described with reference to the drawings. FIGS. 1 and 2 are schematic sectional views each illustrating an example of an optical filter according to the embodiment.

An optical filter 1A illustrated in FIG. 1 is an example in which a dielectric multilayer film 30 is formed on one major surface of a substrate 10. The expression "to have a particular layer on or above a major surface of a substrate" is not limited to a case that the particular layer is in contact with the major surface of the substrate but includes a case that another function layer is provided between the substrate and the particular layer.

FIG. 2 illustrates another example in which an optical filter 1B has a dielectric multilayer film 30 on both major surfaces of the substrate 10.

When the optical filter according to the invention is installed, in the case of an optical filter having a dielectric multilayer film only on one surface, it is preferable that the side of the dielectric multilayer film be made the outside and the opposite side be made the sensor side. In the case of an optical filter having a dielectric multilayer film on both surfaces, it is preferable that the side of a dielectric multilayer film that satisfies particular spectral characteristics as described later be made the outside and the opposite side be made the sensor side.

<Dielectric Multilayer Film(s)>

In the present filter, a dielectric multilayer film is laid on or above at least one major surface of the substrate. The dielectric multilayer film serves as an outermost layer.

The dielectric multilayer film(s) is designed so as to have wavelength selectivity, and at least one dielectric multilayer film is a visible light absorption layer that interrupts visible light mainly by absorption and transmits near infrared light. In the case where a dielectric multilayer film is laid on or above both surfaces of the substrate, either both or only one of the dielectric multilayer films may be a visible light absorption layer. In the case where one of the dielectric multilayer films is a visible light absorption layer, the other dielectric multilayer film may be designed so as to function as a layer having another purpose such as an antireflection layer.

The dielectric multilayer film(s) is a laminate in which a low refractive index film and a high refractive index film are stacked. Laying thin films having different refractive indices makes it possible to increase or decrease the reflectance utilizing the interference action of light. The transmittance decreases as the reflectance becomes larger. Low refractive index films and high refractive index films may be laid alternately.

The extinction coefficient or spin density of a multiplayer film varies depending on its material. The degree of light absorption becomes higher and the transmittance lowers as the extinction coefficient becomes larger. The degree of light absorption becomes higher as the spin density increases.

In the invention, an optical filter having target spectral characteristics is designed by taking the refractive index and the extinction coefficient or spin density of each multilayer film into consideration.

In the invention, the high refractive index film or the low reflective index film satisfies the following spectral characteristics (i-1) and (i-2):

(i-1) an extinction coefficient $k_{600}$ at a wavelength of 600 nm is 0.12 or larger; and (i-2) a minimum extinction coefficient $k_{800\text{-}1570MIN}$ in a wavelength range of 800 to 1,570 nm is 0.01 or smaller.

Alternatively, in the invention, the spin density of the high refractive index film or the low reflective index film is $5.0 \times 10^{10}/\text{nm·cm}^2$ or larger.

The spectral characteristic (i-1) is a characteristic that prescribes absorbability of red light having a wavelength of 600 nm. As for the spectral characteristic (i-1), since the extinction coefficient $k_{600}$ of the high refractive index film or the low reflective index film is 0.12 or larger, red light around a wavelength of 600 nm can be interrupted by absorption rather than reflection. It is therefore not necessary to increase the reflectance around the wavelength of 600 nm, as a result of which an optical filter can be obtained whose reflection color is not prone to be red. It is preferable that $k_{600}$ be 0.18 or larger and that $k_{600}$ be 1.00 or smaller.

Examples of a method for making $k_{600}$ of the high refractive index film or the low refractive index film to fall in the above range include using an amorphous silicon that is not doped with hydrogen, and using an amorphous silicon that is doped with hydrogen at 20 sccm or lower, as a high refractive index film material. The parameter $k_{600}$ can also be controlled by a multilayer film forming method.

The spectral characteristic (i-2) is a characteristic that prescribes absorbability of near infrared light in a wavelength range of 800 nm or longer. As for the spectral characteristic (i-2), the minimum extinction coefficient $k_{800\text{-}1570MIN}$ in a wavelength range of 800 to 1,570 nm being 0.01 or smaller means that the absorbability of near infrared light is small in the wavelength range of 800 to 1,570 nm.

Examples of a method for making $k_{800\text{-}1570MIN}$ of the high refractive index film or the low refractive index film to fall in the above range include using an amorphous silicon that is not doped with hydrogen, and using an amorphous silicon that is doped with hydrogen at 20 sccm or lower, as a high refractive index film material. The parameter $k_{800\text{-}1570MIN}$ can also be controlled by a multilayer film forming method.

A dielectric multilayer film whose visible light absorbability is high and near infrared light absorbability is low can be obtained by using the high refractive index film or the low reflective index film whose extinction coefficient $k_{600}$ and minimum extinction coefficient $k_{800\text{-}1570MIN}$ are in the above particular ranges.

The term "spin density" means an amount of dangling bonds in a film. In the invention, the above particular extinction coefficient $k_{600}$ can be obtained easily in the case where the spin density of the high refractive index film or the low reflective index film is $5.0 \times 10^{10}/\text{nm·cm}^2$ or higher. That is, a dielectric multilayer film that is high in visible light absorbability can be obtained. It is preferable that the spin density of the high refractive index film or the low reflective index film be $1.0 \times 10^{12}/\text{nm·cm}^2$ or higher.

Examples of a method for causing the spin density of the high refractive index film or the low refractive index film to fall in the above range include using an amorphous silicon that is not doped with hydrogen, and using an amorphous silicon that is doped with hydrogen at 20 sccm or lower, as a high refractive index film material.

In the invention, it is preferable that the refractive index of the high refractive index film be 3.0 or higher, even preferably 4.0 or higher. Examples of a material of the high refractive index film include silicon (Si), Ge, ZnSe, $Ta_2O_5$, $TiO_2$, $Nb_2O_5$, and SiN. Among these examples, from the viewpoint of making the above particular extinction coefficient or spin density easier to realize, silicon is preferable and amorphous silicon is particularly preferable.

From the viewpoint of making $k_{600}$ 0.12 or larger or making the spin density $5.0 \times 10^{10}/\text{nm·cm}^2$ or higher, it is even preferable that the material of the high refractive index film be silicon that is not doped with hydrogen or silicon that is doped with a limited amount of hydrogen. Hydrogen doping can be performed by a known method. It is preferable that doping be performed at 20 sccm or lower, and non-doped silicon is particularly preferable.

It suffices that the low refractive index film be a film having a lower refractive index than the high refractive index film. Examples of a material of the low refractive index film include $SiO_2$, $SiO_xN_y$, $Ta_2O_5$, $TiO_2$, and SiO. Two or more of these materials that are lower in refractive index than the high refractive index film can be used in combination. In the case where the materials of the low refractive index film are used in combination, a low refractive index film having a relatively higher refractive index may be laid as a medium refractive index film and a low refractive index film having a relatively lower refractive index may be laid as a low refractive index film. It is preferable that the refractive index of the low refractive index film be 2.5 or lower, even preferably 1.5 or lower. $SiO_2$ is preferable from the viewpoint of productivity.

In the case where the dielectric multilayer film(s) is designed as a visible light absorption layer, from the viewpoint of shieldability in a visible range, it is preferable that the total number of lamination layers of the dielectric multilayer film(s) be 10 or larger, even preferably 20 or larger and further preferably 30 or larger. However, if the total number of lamination layers is too large, a warp or the like may occur or the film thickness may become too large. It is therefore preferable that the total number of lamination layers be 70 or smaller, even preferably 60 or smaller and further preferably 50 or smaller.

Furthermore, from the viewpoint of productivity, it is preferable that the thickness of the dielectric multilayer film be 1.5 μm or smaller, even preferably 1.0 μm or smaller. In the case where the number of dielectric multilayer films is two or larger, it is preferable that the total film thickness be 2.0 μm or smaller.

According to the invention, sufficient shielding can be attained in a visible range even if the number of lamination layers and the thickness of the dielectric multilayer film are small. This is because the extinction coefficient, in a visible range, of the dielectric multilayer film(s) employed in the invention is large and hence it can attain shielding against visible light by absorption.

Furthermore, it is preferable that the outermost layer of the dielectric multilayer film employed in the invention be an oxide layer having a particular density. This makes it possible to obtain an optical filter that is high in hardness. It is preferable that the outermost layer of the dielectric multilayer film be an $SiO_2$ layer having a low density, particularly preferably an $SiO_2$ layer whose outermost layer density is 2.20 g/cc or lower.

The dielectric multilayer film whose outermost layer is an oxide layer having a particular density can be obtained by, for example, performing surface treatment on the dielectric multilayer film during or after stacking of the high refractive index film and the low refractive index film. Examples of a method of the surface treatment include heating the dielectric multilayer film and irradiating the dielectric multilayer film with ions.

The outermost layer of the dielectric multilayer film is lowered in density and increased in hardness as a result of the surface treatment. It is considered that when its outermost layer has been oxidized a non-oxide (e.g., Si) dielectric film is lowered in density and changes to high-hardness $SiO_2$, whereby it is increased in hardness. It is also considered that an oxide (e.g., $SiO_2$) dielectric film is lowered in density when weak OH portions are broken to release H atoms and the bond group portions become strong Si—O bonds to increase the hardness.

A density of the outermost layer can be calculated by measuring an X-ray reflectance (XRR) of the surface of the dielectric multilayer film.

In the case where the dielectric multilayer film is heated as the surface treatment, it is preferable that specific heating conditions are 300° C. or higher, even preferably 550° C. or higher, and 700° C. or lower and 3 minutes or longer, and 3 hours or shorter. The heating step may be executed either during or after formation of the dielectric multilayer film. And the heating atmosphere may be either an air atmosphere or a nitrogen atmosphere.

Examples of a method for irradiating the dielectric multilayer film with ions as the surface treatment include ionizing a rare gas such as Ar by applying a voltage to it in a vacuum environment during or after formation of the dielectric multilayer film. The ionization can be accelerated by applying a high-frequency wave. A high-frequency wave can be generated by, for example, ECR, ICP, RF, or the like. The generation of ions and the ion irradiation can be controlled electrically and a constant voltage control is preferable for these purposes. As a specific ion irradiation condition, in the invention, it is preferable that the ion species be Ar and that the application voltage be 1,000 V or higher, even preferably 2,000 V or higher, and 3,000 V or lower.

Examples of a formation method of the dielectric multilayer film include dry film formation processes such as CVD, sputtering, and a vapor deposition, and wet film formation processes such as a spray method and a dip method. Among these methods, dry film formation processes are preferable from the viewpoint that a high refractive index film having a controlled thin film as mentioned above can be obtained easily.

In the invention, the above-described surface treatment is performed during or after stacking of the dielectric multilayer film.

The prescribed spectral characteristics may be attained by either one or two or more dielectric multilayer films. In the case where two or more dielectric multilayer films are formed, they may have either the same or different structures. In the case where two dielectric multilayer films are provided, they may be such that one is a visible light absorption layer that transmits near infrared light and attains shielding against visible light and the other is a visible/near infrared light transmission layer that transmits both of visible light and near infrared light.

Also in the case where the dielectric multilayer film is designed as an antireflection layer, dielectric films having different refractive indices may be laid in the same manner as in the case of a visible light absorption layer(s). In addition, an antireflection layer may be made of an intermediate refractive index medium, a moth-eye structure in which the refractive index varies gradually, or the like, instead of being a dielectric multilayer film.

<Substrate>

The substrate of the present filter may have either a single-layer structure or a plural-layer structure. The material of the substrate is not particularly limited and may be either an organic material or an inorganic material as long as it is a transparent material that transmits near infrared light. Furthermore, plural different materials may be used in combination.

Preferable transparent inorganic materials include glass and a crystal material.

Examples of the glass material include soda-line glass, borosilicate glass, alkali-free glass, quarts glass, and aluminosilicate glass.

The glass material may be a chemically strengthened glass obtained by replacing alkali metal ions existing adjacent to a major surface of a glass plate and having a small ion diameter (e.g., Li ions or Na ions) with alkali ions having a larger ion diameter (e.g., Na ions or K ions for Li ions or K ions for Na ions) by ion exchange at a glass transition temperature or lower.

Examples of the crystal material include birefringent crystals such as quarts, lithium niobate, and sapphire.

There are no particular limitations on the shape of the substrate; it may have a block shape, a plate shape, or a film shape.

From the viewpoints of reduction in warpage when a dielectric multilayer film is formed, height reduction and suppression of braking of the optical filter, it is preferable that the thickness of the substrate be 0.1 to 5 mm, even preferably 2 to 4 mm.

<Characteristics of Optical Filter>

The optical filter according to the invention which is equipped with the substrate and the dielectric multilayer film(s) functions as an IR bandpass filter that interrupts visible light and transmits near infrared light.

The optical filter according to the invention satisfies all of the following spectral characteristics (ii-1) to (ii-3):

(ii-1) a maximum transmittance $T_{400-680(0deg)MAX}$ at an incident angle of 0° in a wavelength range of 400 to 680 nm is 6% or lower;

(ii-2) a maximum reflectance $R_{400-680(5deg)MAX}$ at an incident angle of 5° in the wavelength range of 400 to 680 nm is 20% or lower; and (ii-3) an average transmittance $T_{X-Y(0deg)AVE}$ at an incident angle of 0° in a wavelength range of X to Y nm is 90% or higher (X is in a range of 800 to 1,530 nm, Y is in a range of 850 to 1,580 nm, and Y−X=50 nm).

The spectral characteristic (ii-1) means that the transmittance is low in the visible range of 400 to 680 nm, and the spectral characteristic (ii-2) means that the reflectance is low in the same visible range. In the case where the spectral characteristics (ii-1) and (ii-2) are satisfied, the transmission color and the refection color both become black, whereby an optical filter that is high in design performance can be obtained.

For example, the spectral characteristic (ii-1) can be attained by using a high refractive index film or a low refractive index film whose extinction coefficient $k_{600}$ is the particular value or larger (spectral characteristic (i-1) mentioned above) or spin density is the particular value or higher, that is, a high refractive index film or a low refractive index film that is high in the absorbability in the visible range.

The spectral characteristic (ii-2) can be attained by designing the dielectric multilayer film(s) so that it exhibits a desired visible light reflectance. Since the transmittance in the visible range is low as indicated by the spectral characteristic (ii-1), light in the visible range can be interrupted sufficiently even if the reflectance is not set high as indicated by the spectral characteristic (ii-2).

It is preferable that the maximum transmittance $T_{400-680(0deg)MAX}$ be 5% or lower. And it is preferable that the maximum reflectance $R_{400-680(5deg)MAX}$ be 10% or lower.

A reflectance relating to the characteristic (ii-2) is a value that is measured from the side of the dielectric multilayer film having the high refractive index film or low refractive index film that satisfies the above-mentioned spectral characteristics (i-1) and (i-2) or whose spin density is the particular value or higher.

The spectral characteristic (ii-3) means that an average transmittance is high in an arbitrary wavelength range having a width of 50 nm in the near infrared range of 800 to 1,580 nm.

In the case where the spectral characteristic (ii-3) is satisfied, the sensitivity of the sensor can be kept high when the optical filter is installed in a sensor.

$T_{X-Y(0deg)AVE}$ being in the range of the spectral characteristic (ii-3) can be attained by, for example, forming a dielectric multilayer film using a high refractive index film or low refractive index film whose minimum extinction coefficient $k_{800-1570MIN}$ is the particular value or smaller (above-mentioned characteristic (i-2)), that is, whose absorbability in the near infrared range is low, and setting the design reflectance low in the wavelength range of X to Y nm.

The optional wavelength range (X to Y nm) having the width of 50 nm can be selected according to sensor sensitivity. In addition, the dielectric multilayer film(s) may be designed so that light shielding can be attained by reflection as necessary in near infrared ranges other than X to Y nm.

It is preferable that the range of X to Y nm be 1,305 to 1,355 nm or 1,525 to 1,575 nm.

That is, it is preferable that the optical filter further satisfy the following spectral characteristic (ii-3A) or (ii-3B):
  (ii-3A) an average transmittance $T_{1525-1575(0deg)AVE}$ at an incident angle of 0° in the wavelength range of 1,525 to 1,575 nm is 90% or higher; or
  (ii-3B) an average transmittance $T_{1305-1355(0deg)AVE}$ at an incident angle of 0° in the wavelength range of 1,305 to 1,355 nm is 90% or higher.

The spectral characteristic (ii-3A) means that the optical filter is high in transmissivity in the near infrared range of 1,525 to 1,575 nm.

The spectral characteristic (ii-3B) means that the optical filter is high in transmissivity in the near infrared range of 1,305 to 1,355 nm.

In the case where the spectral characteristic (ii-3A) or (ii-3B) is satisfied, the sensitivity of the sensor can be made high when the optical filter is installed in a sensor.

It is even preferable that the average transmittance $T_{1525-1575(0deg)AVE}$ be 95% or higher. And it is even preferable that the average transmittance $T_{1305-1355(0deg)AVE}$ be 92% or higher.

Furthermore, it is preferable that the optical filter further satisfy the following spectral characteristic (ii-4):
  (ii-4) the luminous reflectance Y is 5% or lower.

In the case where the spectral characteristic (ii-4) is satisfied, since the reflectance in the visible range is further low, the reflection color becomes black, whereby an optical filter that is high in design performance can be obtained.

It is even preferable that the luminous reflectance Y be 4% or lower.

Still further, it is preferable that the optical filter according to the invention further satisfy the following spectral characteristics (ii-5) and (ii-6):
  (ii-5) the reflection color a* is in a range of ±30; and
  (ii-6) the reflection color b* is in a range of ±30.

In the case where the spectral characteristics (ii-5) and (ii-6) are satisfied, it is easier to obtain an optical filter whose reflection color is black and hence design performance is high.

It is noted that the color index L*a*b* that conforms to JIS Z 8781-4:2013 is used.

It is even preferable that the reflection color a* be in a range of ±10. And it is even preferable that the reflection color b* be in a range of ±10.

The optical filter according to the invention satisfies the above-described spectral characteristics and, furthermore, is high in reliability.

Specifically, the nanoindentation hardness of the optical filter according to the invention is 5.5 GPa or higher. The nanoindentation hardness is an index of indentation hardness and is, in the invention, a value that is measured with a measurement load of 1 mN. In the case where the nanoindentation hardness is in the above range, the surface of the optical filter is given sufficient hardness, whereby cracks or scratches can be prevented from developing in the surface of the optical filter when it is installed in a sensor or used.

It is preferable that the nanoindentation hardness be 7 GPa or higher. From the viewpoint of making the optical filter less prone to be brittle or chipped, it is preferable that the nanoindentation hardness of the optical filter be 20 GPa or lower. It is noted that the nanoindentation hardness is measured from the side of the dielectric multilayer film.

The nanoindentation hardness in the above particular range can be attained by, for example, performing the above-described surface treatment on the dielectric multilayer film.

According to the above-described embodiment, an optical filter can be obtained that is reliable and high in the shieldability against visible light and the transmissivity of near infrared light and that looks black.

A LIDAR sensor according to the invention is equipped with the above-described optical filter according to the invention, whereby a sensor that is high in sensitivity and superior in appearance can be obtained.

As described above, this specification discloses the following optical filters and LiDAR sensor.

(1) An optical filter including:
a substrate; and
a dielectric multilayer film laid on or above at least one major surface of the substrate as an outermost layer, in which:
the dielectric multilayer film is a laminate including a low refractive index film and a high refractive index film laid on each other;
the low refractive index film or the high refractive index film satisfies the following spectral characteristics (i-1) and (i-2);
the optical filter satisfies all of the following spectral characteristics (ii-1) to (ii-3); and
the optical filter has a nanoindentation hardness of 5.5 GPa or higher when a measurement load is 1 mN:
(i-1) an extinction coefficient $k_{600}$ at a wavelength of 600 nm is 0.12 or larger;
(i-2) a minimum extinction coefficient $k_{800-1570MIN}$ in a wavelength range of 800 to 1,570 nm is 0.01 or smaller;
(ii-1) a maximum transmittance $T_{400-680(0deg)MAX}$ at an incident angle of 0° in a wavelength range of 400 to 680 nm is 6% or lower;
(ii-2) a maximum reflectance $R_{400-680(5deg)MAX}$ at an incident angle of 5° in the wavelength range of 400 to 680 nm is 20% or lower; and
(ii-3) an average transmittance $T_{X-Y(0deg)AVE}$ at an incident angle of 0° in a wavelength range of X to Y nm is 90% or higher, where X is in a range of 800 to 1,530 nm, Y is in a range of 850 to 1,580 nm, and Y−X=50 nm.

(2) An optical filter including:
a substrate; and
a dielectric multilayer film laid on or above at least one major surface of the substrate as an outermost layer, in which:
the dielectric multilayer film is a laminate including a low refractive index film and a high refractive index film laid on each other;
the low refractive index film or the high refractive index film has a spin density of $5.0 \times 10^{10}/\text{nm} \cdot \text{cm}^2$ or higher;
the optical filter satisfies all of the following spectral characteristics (ii-1) to (ii-3); and
the optical filter has a nanoindentation hardness of 5.5 GPa or higher when a measurement load is 1 mN:
(ii-1) a maximum transmittance $T_{400-680(0deg)MAX}$ at an incident angle of 0° in a wavelength range of 400 to 680 nm is 6% or lower;
(ii-2) a maximum reflectance $R_{400-680(5deg)MAX}$ at an incident angle of 5° in the wavelength range of 400 to 680 nm is 20% or lower; and
(ii-3) an average transmittance $T_{X-Y(0deg)AVE}$ at an incident angle of 0° in a wavelength range of X to Y nm is 90% or higher, where X is in a range of 800 to 1,530 nm, Y is in a range of 850 to 1,580 nm, and Y−X=50 nm.

(3) The optical filter according to (1) or (2), in which the optical filter further satisfies the following spectral characteristic (ii-4):
(ii-4) a luminous reflectance Y is 5% or lower.

(4) The optical filter according to any one of (1) to (3), in which the optical filter further satisfies the following spectral characteristics (ii-3A):
(ii-3A) an average transmittance $T_{1525-1575(0deg)AVE}$ at an incident angle of 0° in a wavelength range of 1,525 to 1,575 nm is 90% or higher.

(5) The optical filter according to any one of (1) to (4), in which the dielectric multilayer film has a total thickness of 2.0 μm or smaller.

(6) The optical filter according to any one of (1) to (5), in which the high refractive index film is a silicon film and the low refractive index film is a silicon oxide film.

(7) The optical filter according to any one of (1) to (6), in which the high refractive index film is a silicon film and has a spin density of $5.0 \times 10^{10}/\text{nm} \cdot \text{cm}^2$ or higher.

(8) A LiDAR sensor including the optical filter according to any one of (1) to (7).

EXAMPLES

Next, the invention will be described in more detail using Examples.

An extinction coefficient of a dielectric film was calculated by optical thin-film calculation software on the basis of measured values of a reflectance, a transmittance, and a thickness of a single-layer film formed on a quartz substrate.

Figure 5:
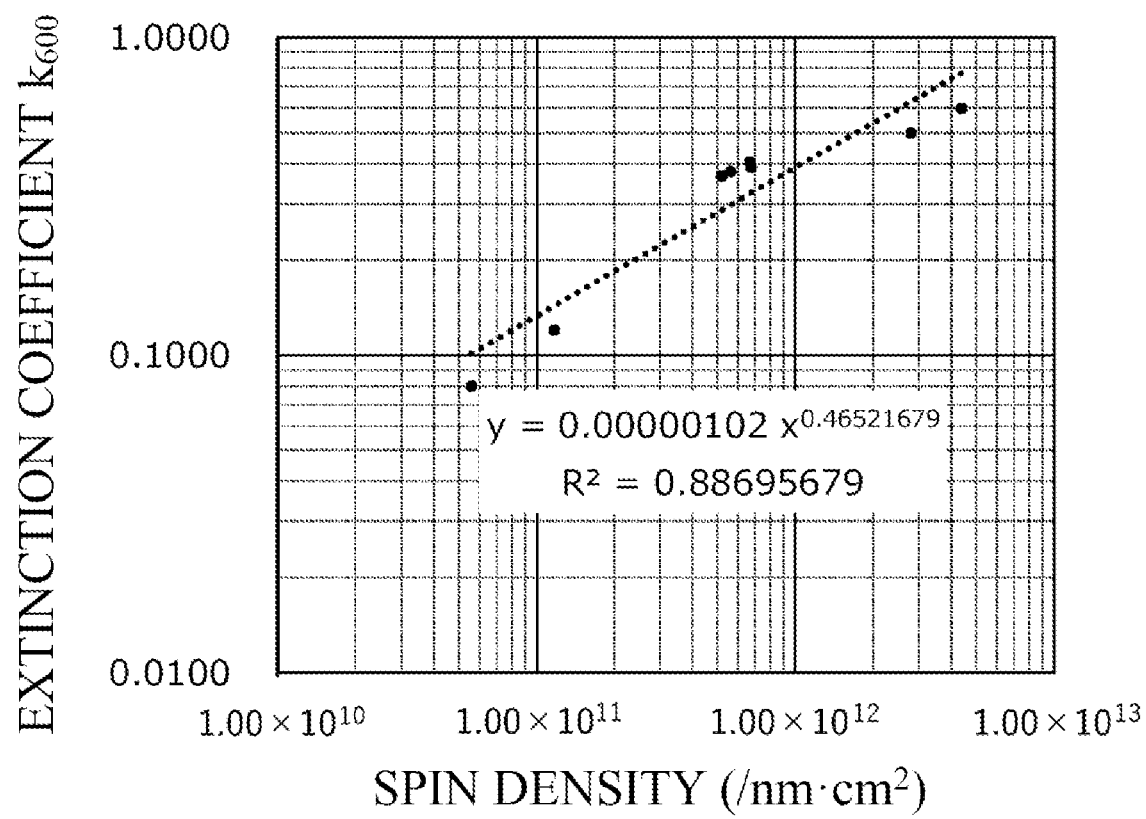
FIG. 5 is a graph showing a relationship between the spin density and the extinction coefficient $k_{600}$.

A spin density of a dielectric film was calculated using the approximation equation shown in FIG. 5 on the basis of an extinction coefficient. The approximation equation shown in FIG. 5 was calculated on the basis of extinction coefficients and spin densities of plural Si single-layer films that are formed on a quartz substrate and are different from each other in the hydrogen introduction amount and the amount of dangling bonds. An extinction coefficient of each Si single-layer film was calculated by the above-described method and a spin density of each Si single-layer film was measured using an electron spin resonance instrument "EMX-nano" produced by Bruker Corporation.

Spectral characteristics were measured using a spectrophotometer "Solid Spec-3700" produced by Shimadzu Corporation.

As for the spectral characteristics, when no particular incident angle is shown, measurement values are ones that were obtained at an incident angle of 0° (i.e., in the direction perpendicular to a major surface of an optical filter).

Chromaticity in a visible wavelength range was measured using "CM-26d" produced by Konica Minolta, Inc.

A color index was evaluated using L*a*b* according to JIS Z 8789:2000.

A visible reflectance was a luminous reflectance (Y value) according to the CIE color system.

Nanoindentation hardness was measured using "ESF-5000plus" produced by Elionix Inc.

A soda glass plate "Wideye" (registered trademark) produced by AGC Inc. that measured 100 mm (vertical)×100 mm (horizontal)×3.3 mm (thickness) was used as a transparent glass substrate.

A dielectric multilayer film was formed using Si having a refractive index 3.5 (amorphous silicon that was not doped with hydrogen) as a high refractive index film material and $SiO_2$ having a refractive index 1.47 as a low refractive index film material. An $SiO_2$ film was formed by reactive sputtering in an oxygen gas atmosphere using an Si target.

<Optical Filter>

Example 1

A dielectric multilayer film (S1-1) of 23 layers was formed on one major surface of a transparent glass substrate by a DC magnetron sputtering method by laying Si films and $SiO_2$ films alternately in which each of the initial layer and the outermost layer was an $SiO_2$ film.

Subsequently, a dielectric multilayer film (S2-1) of 11 layers was formed on the other major surface of the transparent glass substrate by the DC magnetron sputtering method by laying Si films and SiO$_2$ films alternately in which each of the initial layer and the outermost layer was an SiO$_2$ film.

Heat treatment was thereafter performed at 600° C. for 3 minutes.

An optical filter of Example 1 was obtained in the above manner.

Example 2

An optical filter of Example 2 was obtained in the same manner as in Example 1 except that heat treatment conditions were 300° C. and 3 minutes.

Example 3

An optical filter of Example 3 was obtained in the same manner as in Example 1 except that no heat treatment was performed and Ar ion irradiation (LIS-Ar) was performed in a vacuum environment during formation of each dielectric multilayer film. The ion irradiation was performed by a constant voltage control with an application voltage 2,500 V.

Example 4

An optical filter of Example 4 was obtained in the same manner as in Example 3 except that ion irradiation was performed by a constant voltage control with an application voltage 1,250 V.

Example 5

An optical filter of Example 5 was obtained in the same manner as in Example 1 except that neither heat treatment nor Ar ion irradiation was performed.

Characteristics of the optical filter of each of the above Examples and properties of its high refractive index films (Si films) are shown in the following table. Nanoindentation hardness of the optical filter was a measurement value obtained on the side of the multilayer film S1.

Figure 3:
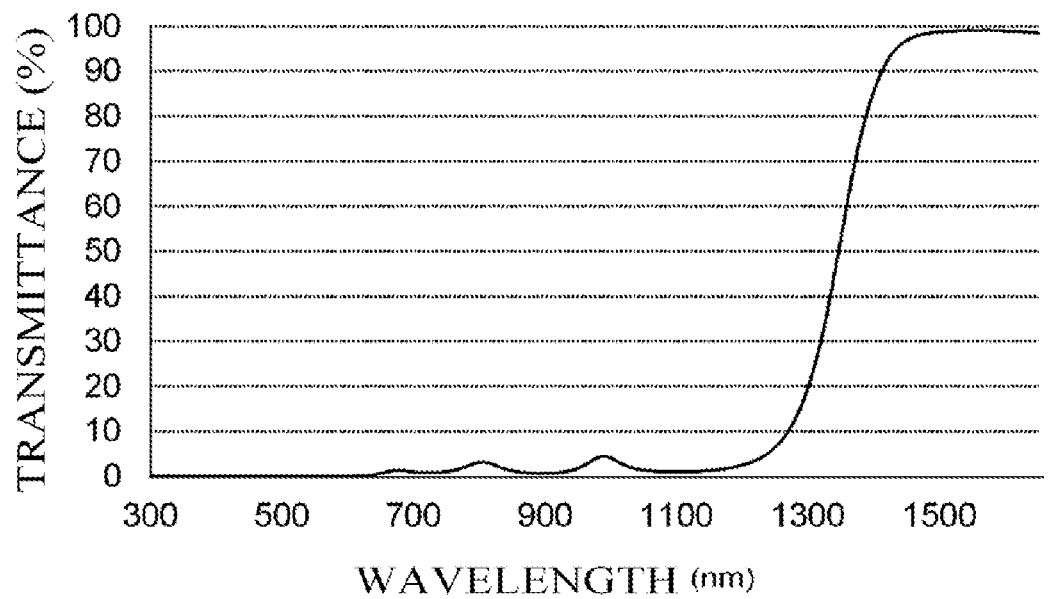
FIG. 3 is a graph showing a spectral transmittance curve of an optical filter of Example 2 in a case that the incident angle was equal to 0°.
Figure 4:
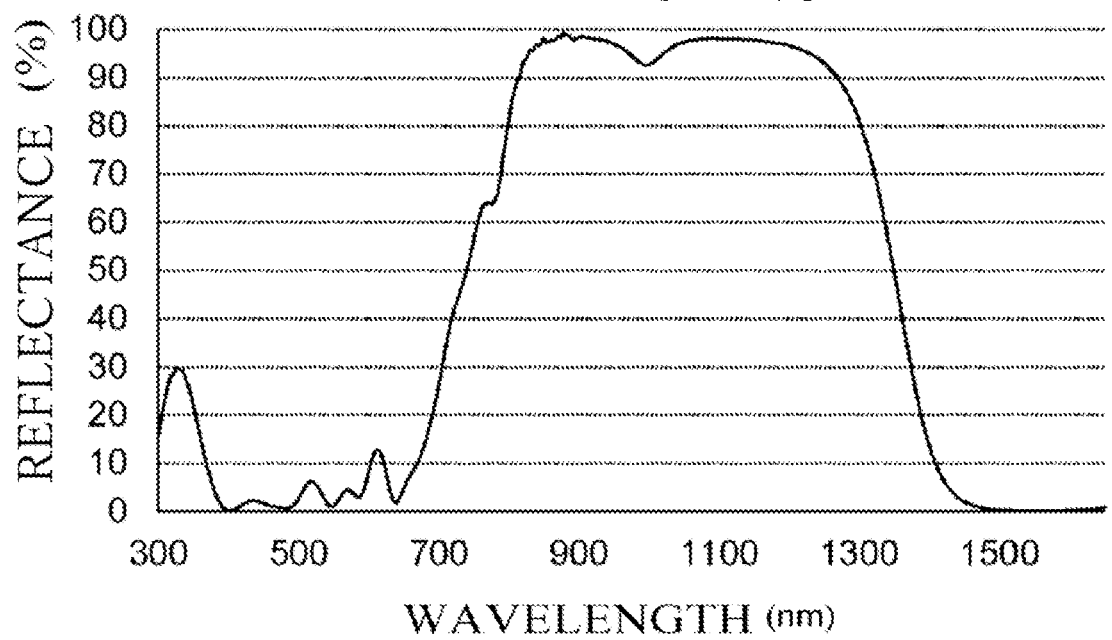
FIG. 4 is a graph showing a spectral reflectance curve of the optical filter of Example 2 in a case that the incident angle was equal to 5°.

A spectral transmittance curve (incident angle: 0°) and a spectral reflectance curve (incident angle: 5°) of the optical filter obtained in Example 2 are shown in FIGS. 3 and 4, respectively. Measurement values of reflection characteristics were measured on the side of the multilayer film S1.

Examples 1-4 are Inventive Examples and Example 5 is a Comparative Example

TABLE 1

| | | | | Ex. 1 | Ex. 2 | Ex. 3 | Ex. 4 | Ex. 5 |
|---|---|---|---|---|---|---|---|---|
| Dielectric multilayer film S1 | Low refractive index film (SiO$_2$) | Total thickness (μm) | | 1.5 | 1.5 | 1.5 | 1.5 | 1.5 |
| | High refractive index film (Si) | Total thickness (nm) | | 0.3 | 0.3 | 0.3 | 0.3 | 0.3 |
| | | Extinction coefficient | $k_{600}$ | 0.29 | 0.29 | 0.29 | 0.29 | 0.29 |
| | | | $k_{800-1570MIN}$ | 0 | 0 | 0 | 0 | 0 |
| | | Spin density (/nm·cm$^2$) | | $5.36 \times 10^{11}$ | $5.36 \times 10^{11}$ | $5.36 \times 10^{11}$ | $5.36 \times 10^{11}$ | $5.36 \times 10^{11}$ |
| | | Nanoindentation hardness (GPa) | | 9.2 | 8.9 | 11.3 | 10.4 | 8 |
| | Number of lamination layers | | | 23 | 23 | 23 | 23 | 23 |
| Dielectric multilayer film S2 | Low refractive index film (SiO$_2$) | Total thickness (μm) | | 1.1 | 1.1 | 1.1 | 1.1 | 1.1 |
| | High refractive index film (Si) | Total thickness (μm) | | 0.15 | 0.15 | 0.15 | 0.15 | 0.15 |
| | | Extinction coefficient | $k_{600}$ | 0.29 | 0.29 | 0.29 | 0.29 | 0.29 |
| | | | $k_{800-1570MIN}$ | 0 | 0 | 0 | 0 | 0 |
| | | Spin density (/nm·cm$^2$) | | $5.36 \times 10^{11}$ | $5.36 \times 10^{11}$ | $5.36 \times 10^{11}$ | $5.36 \times 10^{11}$ | $5.36 \times 10^{11}$ |
| | | Nanoindentation hardness (GPa) | | 9.2 | 8.9 | 11.3 | 10.4 | 8 |
| | Number of lamination layers | | | 11 | 11 | 11 | 11 | 11 |
| Heat treatment | | | | 600° C., 3 min | 300° C., 3 min | — | — | — |
| Ar ion irradiation (application voltage) | | | | — | — | 2,500 V | 1,250 V | — |
| Optical filter | Nanoindentation hardness (GPa) | | | 7.1 | 6.0 | 7.3 | 5.9 | 5.3 |
| | Spectral characteristics | Average reflectance $R_{1525-1575(5deg)AVE}$ (%) | | 0.1 | 0.1 | 0.1 | 0.1 | 0.2 |
| | | Average transmittance $T_{1525-1575(0deg)AVE}$ (%) | | 99.1 | 99.1 | 99.1 | 99.1 | 97.0 |
| | | Maximum transmittance $T_{400-680(0deg)MAX}$ (%) | | 0.47 | 0.67 | 0.73 | 0.658 | 0.1 |
| | | Maximum reflectance $R_{400-680(5deg)MAX}$ (%) | | 17 | 17 | 12.89 | 17.89 | 4.3 |
| | | Average reflectance $R_{400-680(5deg)AVE}$ (%) | | 5.44 | 3.98 | 3.68 | 4.16 | 1.8 |
| | | Luminous reflectance Y on the side of multilayer film S1 (%) | | 4.3 | 2.5 | 3.5 | 3.7 | 2.5 |
| | | Brightness L* on the side of multilayer film S1 | | 24.58 | 18.1 | 21.81 | 22.77 | 12.7 |
| | | Reflection color a* on the side of multilayer film S1 | | 0.7 | −2.2 | −2.2 | −2.2 | −2.2 |
| | | Reflection color b* on the side of multilayer film S1 | | −4.0 | −10.0 | −10.0 | −10.0 | −10.0 |

It is understood from the above results that the optical filters of Examples 1-4 each of which had the dielectric multilayer films that had been subjected to surface treatment by heat treatment or ion irradiation were higher in nanoindentation hardness than the optical filter of Example 5 that had been subjected to no such surface treatment. Furthermore, it is seen that the optical filters of Examples 1-4 each of which had the dielectric multilayer films whose extinction coefficients were in the particular ranges are superior in the near infrared transmissivity in the wavelength range of 1,525 to 1,575 nm, are low in visible light transmittance and reflectance, and look black.

INDUSTRIAL APPLICABILITY

Being high in near infrared light transmissivity and visible light shieldability, reliability, and design performance, the optical filter according to the invention is useful when used for information acquisition devices with advanced performance such as cameras and sensors of transport machines, in particular, LiDAR sensors etc.

DESCRIPTION OF SYMBOLS 1A, 1B . . . Optical filter, 10 . . . Substrate, 30 . . . Dielectric multiplayer film

What is claimed is:

1. An optical filter, comprising:
a substrate; and
a dielectric multilayer film laid on or above at least one major surface of the substrate, the dielectric multilayer film comprising at least two different layers,
wherein:
the dielectric multilayer film comprises a film having a spin density of $5.0 \times 10^{10}$/nm·cm$^2$ or larger,
a surface on a dielectric multilayer film side has a nanoindentation hardness of 5.5 GPa or higher when a measurement load is 1 mN,
a maximum transmittance at an incident angle of 0° in a wavelength range of 400 nm to 680 nm is 6% or lower,
a maximum reflectance at an incident angle of 5° in the wavelength range of 400 nm to 680 nm is 20% or lower, and
an average transmittance at an incident angle of 0° in at least one wavelength range having a width of 50 nm included in a wavelength range of 800 nm to 1,580 nm is 90% or higher.

2. The optical filter according to claim 1, having a luminous reflectance Y of 5% or lower.

3. The optical filter according to claim 1, wherein an average transmittance at an incident angle of 0° in a wavelength range of 1,525 to 1,575 nm is 90% or higher.

4. The optical filter according to claim 1, wherein the dielectric multilayer film has a total thickness of 2.0 μm or less.

5. The optical filter according to claim 1, wherein the film having the spin density of $5.0 \times 10^{10}$/nm·cm$^2$ or larger is a silicon film.

6. A LiDAR sensor comprising the optical filter according to claim 1.

7. An optical filter, comprising:
a substrate; and
a dielectric multilayer film laid on or above at least one major surface of the substrate, the dielectric multilayer film comprising at least two different layers,
wherein:
the dielectric multilayer film comprises a film having an extinction coefficient $k_{600}$ at a wavelength of 600 nm of 0.12 or larger and a minimum extinction coefficient $k_{800-1570MIN}$ in a wavelength range of 800 nm to 1,570 nm of 0.01 or smaller,
a surface on a dielectric multilayer film side has a nanoindentation hardness of 5.5 GPa or higher when a measurement load is 1 mN,
a maximum transmittance at an incident angle of 0° in a wavelength range of 400 nm to 680 nm is 6% or lower,
a maximum reflectance at an incident angle of 5° in the wavelength range of 400 nm to 680 nm is 20% or lower, and
an average transmittance at an incident angle of 0° in at least one wavelength range having a width of 50 nm included in a wavelength range of 800 nm to 1,580 nm is 90% or higher.

8. The optical filter according to claim 7, having a luminous reflectance Y of 5% or lower.

9. The optical filter according to claim 7, wherein an average transmittance at an incident angle of 0° in a wavelength range of 1,525 to 1,575 nm is 90% or higher.

10. The optical filter according to claim 7, wherein the dielectric multilayer film has a total thickness of 2.0 μm or smaller.

11. The optical filter according to claim 7, wherein the film having the extinction coefficient $k_{600}$ at the wavelength of 600 nm of 0.12 or larger and the minimum extinction coefficient $k_{800-1570MIN}$ in the wavelength range of 800 nm to 1,570 nm of 0.01 or smaller is a silicon film.

12. A LiDAR sensor comprising the optical filter according to claim 7.

* * * * *